United States Patent Office 3,347,855
Patented Oct. 17, 1967

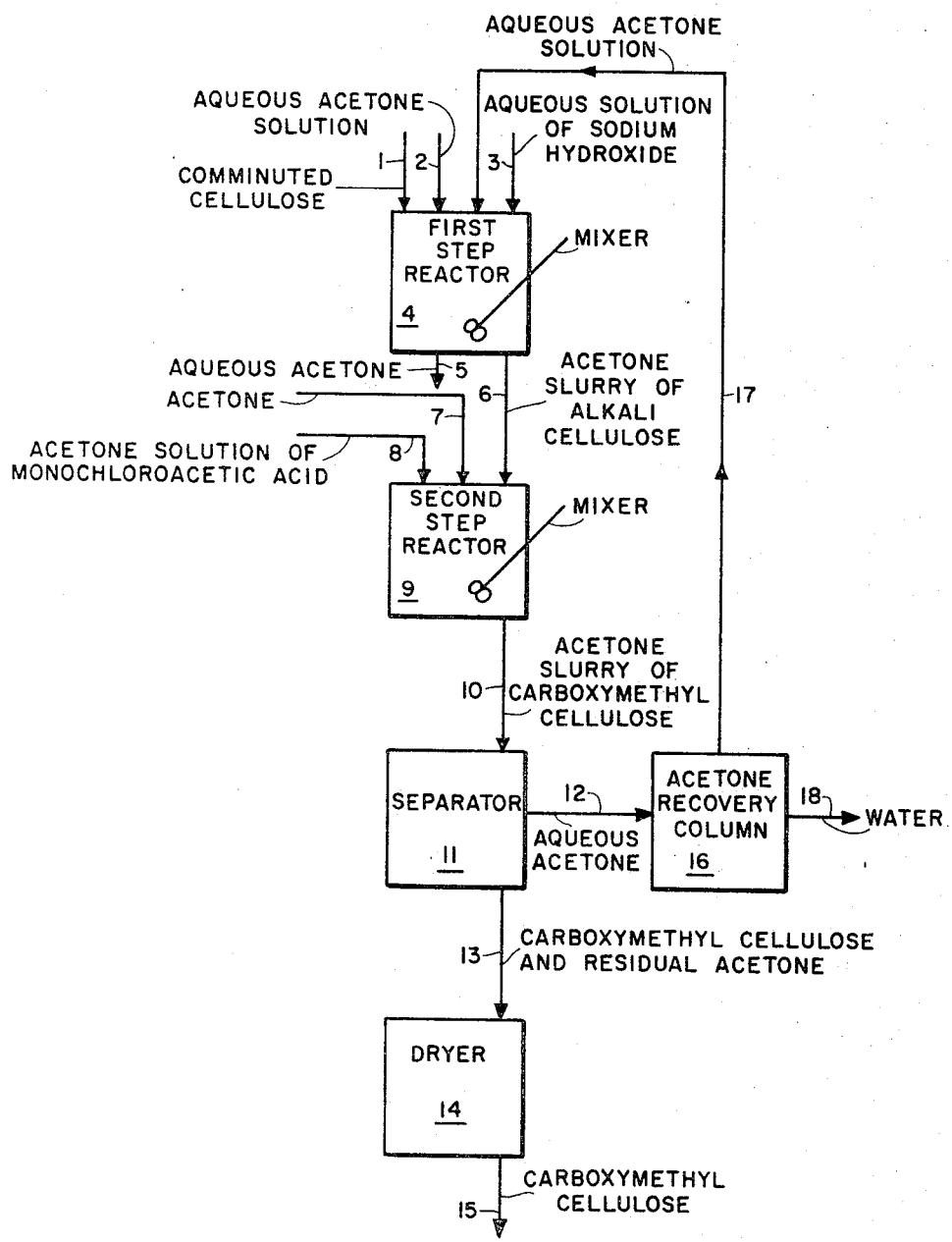

3,347,855
ACETONE SLURRY PROCESS FOR THE PREPARATION OF SOLUBLE CARBOXYMETHYL CELLULOSE
Russell Nelson, Memphis, Tenn., assignor to The Buckeye Cellulose Corporation, Cincinnati, Ohio, a corporation of Ohio
Filed Aug. 4, 1964, Ser. No. 387,378
6 Claims. (Cl. 260—231)

This invention relates to the production of alkali metal carboxymethyl cellulose, referred to herein as carboxymethyl cellulose, by a slurry process wherein comminuted cellulose is contacted with chemical reagents while slurried in an aqueous acetone solution.

More particularly, the invention provides an acetone slurry process for the efficient use of the etherifying reagent in the production of soluble carboxymethyl cellulose which exhibits improved clarity in water, dilute solutions of sodium hydroxide and other liquid systems wherein carboxymethyl cellulose is commonly dissolved. Specifically, the invention provides an acetone slurry process for the production of carboxymethyl cellulose wherein novel and critical water-to-cellulose, acetone-to-water and total liquid-to-cellulose ratios are maintained in the acetone slurry media to result in the aforesaid improvements in efficiency and solution clarity.

Several slurry methods for the production of carboxymethyl cellulose, wherein aqueous acetone solutions are used as the slurry media, are available in the prior art, but these processes do not result in the production of carboxymethyl cellulose derivatives which are highly soluble in water to yield solutions exhibiting enhanced clarity. Furthermore, the available acetone slurry processes are not particularly efficient in the use of etherifying reagents in terms of the actual versus the theoretical usage of etherifying reagent to attain a desired degree of substitution. In fact, U.S. 2,517,577, granted to Eugene D. Klug and John S. Tinsley on Aug. 8, 1950, illustrates this point very clearly in showing that aqueous solutions of isopropanol and tertiary butyl alcohol are superior reaction media, or diluents, for use in the manufacture of carboxymethyl cellulose and other cellulose derivatives as directly compared with the use of aqueous acetone slurry media. Applicant, however, has found that the use of particular and critical slurry weight ratios in connection with the use of aqueous acetone as a slurry media results in the efficient production of carboxymethyl cellulose exhibiting improved qualities of solubility and clarity in water.

The degree of substitution and etherifying reagent efficiency achieved by the practice of the present invention is also comparable to that obtained with the isopropyl alcohol and tertiary butyl alcohol slurry media favored in the prior art.

Applicant is also aware of U.S. 3,069,409, granted to John E. Henry et al. on Dec. 18, 1962, wherein it is taught that the performance of slurry media can be improved by maintaining specific water-to-cellulose ratios in processes for preparing cellulose derivatives wherein certain specific diluents, including acetone, are used. It is noted, however, that the carboxymethyl cellulose products prepared in acetone slurries by the process of U.S. 3,069,409 are reported therein as inferior to those prepared in other slurry media. Applicant is unaware of any slurry process employing acetone for the preparation of carboxymethyl cellulose which has the capability of producing carboxymethyl cellulose products exhibiting solution clarities like those of the instant product.

It is, therefore, an object of this invention to provide a novel process for the acetone slurry manufacture of carboxymethyl cellulose.

It is a further object of this invention to provide a single-stage acetone slurry process for the preparation of carboxymethyl cellulose which dissolves in water to yield solutions exhibiting improved clarity.

It is a still further object of this invention to provide a two-stage acetone slurry process which makes highly efficient use of the etherifying agent employed in preparing carboxymethyl cellulose which dissolves in water to yield solutions exhibiting improved clarity.

These and other objects are achieved according to the process of the present invention by slurrying cellulose in aqueous acetone for treatment with sodium hydroxide and etherifying agents as more fully hereinafter described. Applicant has found that for highly soluble carboxymethyl cellulose derivatives to result from an acetone slurry process, the total liquid-to-cellulose ratio must be higher than that employed in known acetone slurry processes. The total liquid, or aqueous acetone, referred to herein is the sum of the weights of the acetone and the water present in the slurry.

Further, the attainment of highly soluble carboxymethyl cellulose derivatives at high efficiency is dependent on maintaining different and critical water-to-cellulose, acetone-to-water and total liquid-to-cellulose ratios during both the formation of alkali cellulose and the etherification thereof.

In general, the practice of the present invention consists of maintaining ratios of water-to-cellulose, acetone-to-water, and total liquid-to-cellulose that favor the formation of uniform alkali cellulose in acetone media in a first stage to achieve product solubility and clarity, and in a second stage selecting water-to-cellulose, acetone-to-water and total liquid-to-cellulose ratios that favor etherification efficiency in an acetone slurry media. By this means applicant has found it possible, unexpectedly and contrary to the prior art, to efficiently produce highly soluble carboxymethyl celluloses yielding solutions of improved solubility, as evidenced by their clarity, using a slurry media comprised of aqueous acetone. It is noted that there is real merit in the discovery of such a process since acetone has definite advantages, in recovery and in product drying, over the more highly regarded and more expensive prior art diluents such as isopropyl alcohol and tertiary butyl alcohol.

In describing the herein disclosed process, the term, single-stage slurry process, refers to a slurry process wherein the water-to-cellulose, acetone-to-water and total liquid-to-cellulose ratios maintained in the second or etherification step are essentially the same as those maintained in the preceding step wherein comminuted cellulose is converted to alkali cellulose. The term, two stage process, refers to a slurry process wherein the slurry media ratios used in the etherification step are substantially altered from those used in the preceding cellulose alkalization step. The designation of a process as single-stage or two-stage does not, therefore, refer to the use of the same or different reactor vessels to carry out the process steps of cellulose alkalization and etherification, but to the maintenance of the critical slurry ratios set forth hereinbelow in the processing steps whereby comminuted cellulose is converted to carboxymethyl cellulose while slurried in an aqueous acetone solution.

One suitable apparatus for carrying out preferred embodiments of the present process is illustrated in the attached drawing, wherein rectangular areas, 4, 9, 11, 14 and 16 represent a first step reactor, a second step reactor, a separator, a dryer and an acetone recovery column. The remaining, numbered, arrowed lines indicate the pipelines through which the process materials are transported.

In the practice of the invention purified cellulose, for example chemical cellulose prepared from wood or cotton linters and known as dissolving grade cellulose, is slurried in an aqueous solution of acetone. Since one object of a slurry process for the conversion of cellulose into cellulose derivatives is to achieve intimate contact between cellulose and relatively small amounts of chemical reagents, it is desirable that the cellulose be comminuted by shredding or grinding. While fibrous cellulose can be agitated to form a well dispersed slurry wherein cellulose is intimately contacted with chemical reagents, those skilled in the chemical arts will realize that contact is improved by reducing the size of cellulose particles to achieve greater particle surface area. Accordingly, applicant prefers to use dissolving grade cellulose cut or ground to pass a Tyler standard screen of about 20 to about 60 mesh, but the beneficial results of the present process are obtained with fibrous cellulose or with cellulose comminuted to pass screens having still smaller openings than those mentioned above.

In the first step of the present process, cellulose comminuted as stated above is slurried in a solution of aqueous acetone and contacted with a water-soluble alkali metal hydroxide, for example sodium hydroxide, to convert the cellulose into alkali cellulose. Other water-soluble alkali metal hydroxides can also be used to prepare the alkali cellulose. As indicated above, applicant has found that the solubility and clarity of carboxymethyl cellulose products produced in aqueous acetone slurry media is dependent on the composition and amount of the aqueous acetone slurry media present during the steps wherein the dissolving grade cellulose is first converted into alkali cellulose.

Accordingly, the dissolving grade cellulose is contacted with a water-soluble alkali metal hydroxide at a slurry temperature of about 0° C. to about 30° C., preferably about 5° C. to about 25° C., for a period of about 0.1 hour to about 1 hour, preferably about 0.2 hour to about 0.6 hour, in an aqueous acetone slurry containing about 15 parts to about 35 parts, preferably about 20 parts to about 30 parts of total liquid per part of bone dry cellulose. The use of the term "parts" in the foregoing statement, as well as throughout the remainder of the disclosure and claims, refers to parts by weight. It is also important that the aqueous acetone slurry media in the alkalization step be adjusted to contain certain amounts of water in relation to the amount of bone dry cellulose present in the slurry. Accordingly, the aqueous acetone slurry media is made up to contain a ratio of about 1.85 parts to about 8.75 parts, preferably about 2.15 to about 7.00 parts of water per part of bone dry cellulose in the slurry. It is of further importance in the alkalization step that the aqueous acetone slurry media contain a ratio of about 3 parts to about 7 parts, preferably about 4 parts to about 6 parts, of acetone per part of water. In any event, the values selected from the above ranges for parts water per part of bone dry cellulose and parts acetone per part of water in the slurry are such that the ranges of total liquid per part of bone dry cellulose are maintained as stated above.

In the case where improved solution clarity in carboxymethyl cellulose products produced in acetone slurry media is the only desired benefit, the above ratios can remain the same in the second step, the etherification step, of the present process. As stated above, the embodiment of the present process wherein the aqueous acetone slurry ratios remain the same in the etherification step as in the alkalization step are referred to as the one-stage process.

In the case where both high etherifying reagent efficiency, in terms of actual use versus theoretical use, and solution clarity are desired, the first step aqueous acetone slurry ratios previously stated for use in the alkalization step are adjusted as stated below in the etherification step.

Accordingly in the second or etherification step of the present two-stage process, the alkali cellulose, remaining as a slurry in the aqueous acetone slurry media, is contacted with an etherification reagent, for example monochloroacetic acid, after adjusting the slurry ratios to the ranges given below. The slurry alkali cellulose is contacted with the monochloroacetic acid at a slurry temperature of above 40° C. to about 100° C., preferably about 65° C. to about 75° C., for a period of about 0.3 hour to about 10 hours, preferably about 2 hours to about 5 hours. The monochloroacetic acid can be added as a solid or as a solution, and it is particularly convenient to add the monochloroacetic acid in the form of a solution of monochloroacetic acid in acetone. Other etherification agents, for example sodium chloroacetate and bromoacetic acid, can also be used to etherify the alkali cellulose.

Accordingly the alkali cellulose in the etherification step is contacted with an etherification agent in an acetone slurry media made up to contain a ratio of about 1.15 parts to about 3.85 parts, preferably about 1.25 parts to about 3.50 parts of water per part of the original bone dry cellulose, now present in the slurry as alkali cellulose. It is of further importance in the etherification step that the aqueous acetone slurry contain a ratio of about 8 parts to about 12 parts, preferably about 9 parts to about 11 parts of acetone per part of water. In any event, the values selected from the above ranges for parts water to part bone dry cellulose and parts acetone to part water must be such as to insure an aqueous acetone slurry containing about 15 parts to about 35 parts, preferably about 20 parts to about 30 parts of total liquid per part of bone dry cellulose; as hereinbefore stated for the first step, the alkalization step of the present process.

In the alkalization and etherification steps of both the single and the two-stage process, the slurry conditions for which are stated above, it has been found that desirable amounts of sodium hydroxide and monochloroacetic acid are in a ratio of about 2 to about 2.5 moles of sodium hydroxide per mole of monochloroacetic acid. About 0.4 mole to about 2.5 moles of monochloro acetic acid per mole of bone dry cellulose is used depending on the desired degree of substitution in the carboxymethyl cellulose product. The molecular weight of cellulose is taken as the molecular weight of one anhydroglucose unit at 162.

The degree of substitution (D.S.) of the carboxymethyl cellulose products stated herein were determined by the method published in Svensk Papperstidning 63 (1960), p. 714 by K. Wilson as modified by the use of methyl alcohol instead of ethyl alcohol. The percent reaction efficiency stated herein was calculated by the following formula using the D.S. data as determined above.

$$\text{Reaction efficiency percent} = \frac{\text{D.S.} \times (\text{moles of cellulose employed}) \times 100}{\text{moles of monochloroacetic acid employed}}$$

The solution ratings stated herein are based on the visual inspection of solutions containing 1% by weight of the carboxymethyl cellulose products in water. The solution ratings were assigned according to an arbitrary standard for solution appearance, as follows, with the solution quality improving as the solution rating increases.

| Solution appearance: | Solution rating |
| --- | --- |
| Cloudy | −3 |
| Very many gels | −2 |
| Many gels | −1 |
| Gels | 0 |
| Few gels | +1 |
| Very few gels | +2 |
| Clear | +3 |

The single-stage process is preferably conducted as follows. Cellulose cut to pass about a 30 mesh screen is slurried in 25 parts of aqueous acetone solution per part of cellulose. The aqueous acetone solution contains about 4.00 parts of water per part of cellulose, leaving about 21 parts of acetone per part of cellulose. The ratio of parts acetone to parts water is, therefore, about 5.

In step one, i.e., the alkalization step of the preferred single-stage process, the cellulose, slurried in aqueous acetone solution as stated above, is contacted with about 2.2 moles of sodium hydroxide per mole of cellulose, added as a 50% solution in water over a period of about 0.2 hour, while the slurry is vigorously agitated at a temperature of 25° C. The slurry temperature and vigorous agitation are maintained for an additional period of about 0.3 hour to convert the original cellulose into alkali cellulose. The resulting alkali cellulose is treated with about 1 mole of monochloroacetic acid, added as a solution in a small amount of acetone, per mole of cellulose. The monochloroacetic acid is added over a period of about 0.2 hour with vigorous agitation and the agitation is maintained at a slurry temperature of about 70° C. for about 3 hours thereafter to convert the alkali cellulose of the first step into carboxymethyl cellulose. Carboxymethyl cellulose prepared according to this preferred one-stage process will have a solution rating as stated hereinabove of about +2. The reaction efficiency for this preferred single-stage process will be about 60%.

The two-stage process is preferably carried out as follows. In the preferred two-stage process, the cellulose, slurried in aqueous acetone solution and contacted with sodium hydroxide as in the first step of the single-stage process set forth above, is converted into alkali cellulose. The resulting aqueous acetone slurry media with the alkali cellulose slurried therein is adjusted, in the second or etherification step of the two-stage process, to contain about 2.30 parts of water per part of cellulose together with about 10 parts of acetone per part of water.

In the two-stage process the second, or the etherification step, is preferably carried out, with the exception of the adjustment of the aqueous acetone slurry media composition as stated above, like the etherification step of the preferred one-stage process. Carboxymethyl cellulose prepared according to this preferred two-stage process will have a solution rating as stated hereinabove of about +3. The reaction efficiency for this preferred two-stage reaction will be about 74%.

It is noted that the use of the same novel and particular amounts and compositions of aqueous acetone slurry media in the one-stage process produced carboxymethyl cellulose of improved clarity, but in a process having a reaction efficiency of about 60% while in the two-stage process the improved solution clarity is maintained while the reaction efficiency of the process is increased from about 60% to about 74%.

From the above results and those of the examples hereinafter set forth, it is seen that contrary to the prior art teachings, aqueous acetone is actually a very good media in a slurry process for producing carboxymethyl cellulose of improved clarity or of improved clarity in efficient reaction, provided that the limitations pertaining to the amount and composition of aqueous acetone slurry media stated herein are adhered to.

The adjustment of the aqueous acetone sluurry media to the limits stated herein for the second, or etherification step, of the two-stage process, can be made by introducing additional amounts of acetone in the etherification stage, or by using a new aqueous acetone slurry media with the specified composition in the specified amounts to slurry the alkali cellulose in the etherification step. It is preferable, however, to effect the slurry media adjustment by removing a portion of the aqueous acetone slurry media used in the alkalization step. The removed aqueous acetone is then replaced with additional acetone so that the slurry conditions specified for the two-stage etherification step are attained.

The following examples illustrate specific embodiments of the one- and two-stage processes together with illustrations showing the effect of operating outside the disclosed limits. Unless otherwise specified, the alkalization agent used in the examples was about 2.2 moles of sodium hydroxide per mole of cellulose, and the etherification agent was about 1 mole of monochloroacetic acid per mole of cellulose.

Example I

The two-stage process can be described with reference to the drawing as follows. 105 pounds of comminuted wood cellulose containing 5 pounds of water was introduced into the first-step reactor 4 through line 1. An aqueous acetone solution containing 2083 pounds of acetone and 358 pounds of water was simultaneously introduced into the first-step reactor 4 through line 2. The resulting slurry of comminuted cellulose in aqueous acetone was then vigorously agitated. Next, 108 pounds of an aqueous solution containing 50% of sodium hydroxide were added through line 3 over a period of 0.167 hour while continuing the agitation. The total liquid-to-cellulose ratio in the first-step reactor was 25 to 1, while the water-to-cellulose ratio was about 4.17 to 1 and the acetone-to-water ratio was about 5 to 1. The first-step reaction slurry was maintained at a temperature of 25° C., and the slurry contents of the reactor were stirred vigorously for 0.25 hour to alkalize the cellulose. Following the alkalization period, 1360 pounds of liquor containing 190 pounds of water were removed from the reactor 4 through line 5, before dropping the resulting slurry of alkali cellulose through line 6 into the second-step reactor 9. 1202 pounds of anhydrous acetone were added to the second-step reactor 9 through line 7 while maintaining vigorous agitation in the reactor. The resulting slurry of alkali cellulose was then treated with 58.4 pounds of monochloroacetic acid dissolved in 158 pounds of acetone and introduced into the reactor through line 8 over a period of 0.25 hour. The total liquid-to-cellulose ratio in the second-step reactor was 25 to 1 while the water-to-cellulose ratio was about 2.27 to 1 and the acetone-to-water ratio was about 10 to 1. The temperature of the vigorously agitated mixture was then raised to 70° C. and maintained at this temperature for 2.5 hours with continuing agitation to etherify the cellulose. At the end of the etherification period, the slurry was cooled at 45° C. and dropped into the separator 11 through line 10. In the separator the carboxymethyl cellulose product was separated from the aqueous acetone slurry and dropped through line 13 into the dryer 14. The separated aqueous acetone was removed from the separator through line 12 leading to the acetone recovery column 16. In the acetone recovery column 16, sufficient water was removed from the aqueous acetone solution through line 18 to adjust the acetone to the desired dryness for entry into the process at the first-stage reactor 4 through line 17. The carboxymethyl cellulose product resulting from the process of Example I was taken from the dryer through line 15 after removing residual solvent and water in the dryer. The carboxymethyl cellulose product of this example was found to have a D.S. of 0.76 and was noted to be visually free of fibers and gels when dissolved in water to a 1% concentration by weight. Based upon the amount of etherifying agent used in the second-step reactor 9, as compared with the theoretical amount to produce the degree of substitution stated above, the process of Example I exhibited a reaction efficiency of 76%. The carboxymethyl cellulose product of Example I was especially suited for use as an anti-redeposition agent in detergent formulations.

Example II

The single-stage process can be described with reference to the drawing as follows. 105 pounds of comminuted wood cellulose containing 5 pounds of water was introduced into the first-step reactor 4 through line 1. An aqueous acetone solution containing 1925 pounds of acetone and 358 pounds of water was simultaneously introduced into the first-step reactor 4 through line 2.

The resulting slurry of comminuted cellulose in aqueous acetone was then vigorously agitated. Next 108 pounds of an aqueous solution containing 50% of sodium hydroxide were added through line 3 over a period of 0.167 hour while continuing the agitation. The total liquid-to-cellulose ratio in the reactor was about 23.4 to 1, while the water-to-cellulose ratio was about 4.17 to 1 and the acetone-to-water ratio was about 4.6 to 1. The cellulosic slurry was then maintained at a temperature of 25° C. and while continuing the vigorous agitation for an additional 0.25 hour to alkalize the cellulose.

Following the alkalization period, the resulting slurry

Examples III–V

Each of Examples III–V and Illustrations I and II was run as a two-stage process by the procedure of Example I with the exception that the total liquid-to-cellulose ratio, the water-to-cellulose ratio, and the acetone-to-water ratio in the steps of alkalization and etherification were as noted below in Table I. Illustrations I and II are included to illustrate the effect of operation out of the disclosed slurry ratio limits for the two-stage process. The carboxymethyl cellulose products prepared by the processes of Examples III–V were suitable for use as thickeners in water-based paints.

TABLE I

| Example | Alkalization Slurry Rates | | | Etherification Slurry Rates | | | Reaction Eff., Percent | Solution Rating |
|---|---|---|---|---|---|---|---|---|
| | Total Liquid: Cellulose | Water: Cellulose | Acetone: Water | Total Liquid: Cellulose | Water: Cellulose | Acetone: Water | | |
| III | 15:1 | 3.75:1 | 3:1 | 15:1 | 1:15 | 12:1 | 65 | +2 |
| IV | 25:1 | 4.17:1 | 5:1 | 25:1 | 2.27:1 | 10:1 | 75 | +3 |
| V | 35:1 | 4.37:1 | 7:1 | 35:1 | 2.69:1 | 12:1 | 68 | +2 |
| Illustration I | 15:1 | 1.88:1 | ² 8:1 | 15:1 | 1.15:1 | 12:1 | 72 | −1 |
| Illustration II | 20:1 | 6.67:1 | ² 2:1 | 20:1 | 1.82:1 | 10:1 | 77 | −1 |
| VI | 15:1 | 3.75:1 | 3:1 | (¹) | (¹) | (¹) | 46 | +2 |
| VII | 25:1 | 4.17:1 | 5:1 | (¹) | (¹) | (¹) | 55 | +3 |
| VIII | 35:1 | 4.37:1 | 7:1 | (¹) | (¹) | (¹) | 60 | +2 |
| Illustration III | 15:1 | ² 1.15:1 | ² 12:1 | (¹) | (¹) | (¹) | 67 | −2 |
| Illustration IV | 25:1 | 1.92:1 | ² 12:1 | (¹) | (¹) | (¹) | 77 | −1 |

¹ Single-stage process slurry ratio same as in first-step.
² Slurry ratios outside specified ratio range.

of alkali cellulose in the first reactor was passed into the second-step reactor 9 through line 6.

No adjustment in the slurry composition was made by removing liquid through line 5 or adding acetone through line 7, except for the small quantity of acetone used as a solvent for the monochloroacetic acid below, and for this reason the process is referred to as a single-stage process.

In the etherification, or second step reactor, the slurry of alkali cellulose was treated with 58.4 pounds of monochloroacetic acid dissolved in 158 pounds of acetone and introduced into the reactor through line 8 over a period of 0.25 hour.

The total liquid-to-cellulose ratio in the second-step reactor 9 was about 25 to 1, while the water-to-cellulose ratio was about 4.17 to 1 and the acetone-to-water ratio was about 5 to 1.

The temperature of the vigorously agitated slurry was then raised to 70° C. and maintained at this temperature for 2.5 hours while continuing the agitation. At the end of the etherification period, the slurry was cooled to 45° C. and dropped into the separator 11 through line 10. In the separator the carboxymethyl cellulose product was separated from the aqueous acetone slurry and dropped through line 13 into the dryer 14. The separated aqueous acetone was removed from the separator through line 12 leading to the acetone recovery column 16. In the acetone recovery column 16, sufficient water was removed from the aqueous acetone solution through line 18 to adjust the acetone to the desired dryness for entry into the process at the first-step reactor 4 through line 17. The carboxymethyl cellulose product resulting from the process of Example II was taken from the dryer through line 15 after removing residual solvent and water in the dryer. The carboxymethyl cellulose product of this example was found to have a D.S. of 0.55 and was noted to be visually free of fibers and gels when dissolved in water to a 1% concentration by weight. Based upon the amount of etherifying agent used in the second-step reactor 9, as compared with the theoretical amount to produce the degree of substitution stated above, the process of Example II exhibited a reaction efficiency of 55%. The carboxymethyl cellulose product of Example II was especially suited for incorporation in the drilling mud compositions used in drilling oil wells.

Examples VI–VIII

Each of Examples VI–VIII was run as a single-stage process by the procedure of Example II with the exception that the slurry ratios in both the alkalization and etherification step differed from the values stated in Example II as noted in Table I above. Illustrations III and IV are included to illustrate the effect of operation out of the disclosed slurry ratio limits for the single-stage process. The carboxymethyl cellulose products prepared by the processes of Examples VI–VIII were suitable for use as anti-redeposition agents in detergent formulations.

The data presented in Table I above clearly show the advantage of the present process in producing a carboxymethyl cellulose of good solution appearance, albeit at a lower reaction efficiency, when operated as a single-stage process, than do the illustrative processes operated outside the limits of the present process. In a similar fashion the data presented in Table I show that both good solution appearance and high reaction efficiency can be achieved by operating the process of the invention as a two-stage process while adhering to the processing conditions set forth herein.

While the embodiments of this invention have been described as batch processes it is obvious that they are adaptable to continuous operation by merely feeding the prescribed amounts of raw materials into reactor vessels designed for good agitation and the prevention of backmixing. Also, the stated slurry ratio adjustments between the first and second steps in the two-stage process can be accomplished in a single reactor so that multiple reactors, as depicted in the accompanying drawing, are convenient but not essential to the operation of the two-stage process.

While specific examples of processes embodying the present invention have been described above, it will be apparent that many changes and modifications may be made in the methods of procedure without departing from the spirit of the invention. It will be understood, therefore, that the examples cited and the procedures set forth are intended to be illustrative only and are not intended to limit the invention.

Having thus described the invention, what is claimed is:

1. In a slurry process for the production of carboxymethyl cellulose wherein cellulose is slurried in an aqueous solution of acetone and contacted in a first step with a water-soluble alkali metal hydroxide and the resulting alkali cellulose is contacted with monochloroacetic acid and etherified in a second step while still slurried in an aqueous solution of acetone, the improvement which consists of maintaining a total liquid-to-cellulose ratio in said steps of about 15 to about 35 to 1 while contacting the cellulose and the alkali cellulose in said steps with about 2 to about 2.5 moles of a water-soluble alkali metal hydroxide per mole of monochloroacetic acid and using about 0.4 mole to about 2.5 moles of monochloroacetic acid per mole of cellulose while further maintaining as liquid ratios in said first step, a water-to-cellulose ratio of about 1.85 to about 8.75 to 1 and an acetone-to-water ratio of about 3 to about 7 to 1, while contacting the slurried cellulose with the sodium hydroxide at a slurry temperature of about 0° C. to about 30° C. for a period of about 0.1 to about 1 hour and altering said liquid ratios in said second step to a water-to-cellulose ratio of about 1.15 to about 3.85 to 1 and an acetone-to-water ratio of about 8 to about 12 to 1 while contacting the alkali cellulose with the monochloroacetic acid at a slurry temperature of about 40° C. to about 100° C. for a period of about 0.3 hour to about 10 hours, whereby carboxymethyl cellulose exhibiting high substitution uniformity and improved clarity in aqueous solutions is produced in an efficient manner with regard to the amount of etherifying agent used in said second step.

2. In a slurry process for the production of carboxymethyl cellulose wherein cellulose is slurried in an aqueous solution of acetone and contacted in a first step with sodium hydroxide and the resulting alkali cellulose is contacted with monochloroacetic acid and etherified in a second step while still slurried in an aqueous solution of acetone, the improvement which consists of maintaining a total liquid-to-cellulose ratio in said steps of about 20 to about 30 to 1 while contacting the cellulose and the alkali cellulose in said steps with a total of about 2 to about 2.5 moles of sodium hydroxide per mole of monochloroacetic acid and using about 0.4 mole to about 2.5 moles of monochloroacetic acid per mole of cellulose while further maintaining as liquid ratios in said first step, a water-to-cellulose ratio of about 2.15 to about 7.00 to 1 and an acetone-to-water ratio of about 4 to about 6 to 1, while contacting the slurried cellulose with the sodium hydroxide at a slurry temperature of about 5° C. to about 25° C. for a period of about 0.2 to about 0.6 hour and altering said liquid ratios in said second step to a water-to-cellulose ratio of about 1.25 to about 3.50 to 1 and an acetone-to-water ratio of about 9 to about 11 to 1 while contacting the alkali cellulose with the monochloroacetic acid at a slurry temperature of about 65° C. to about 75° C. for a period of about 2 to about 5 hours, whereby carboxymethyl cellulose exhibiting high substitution uniformity and improved clarity in aqueous solutions is produced in an efficient manned with regard to the amount of etherifying agent used in said second step.

3. In a slurry process for the production of carboxymethyl cellulose wherein cellulose is slurried in an aqueous solution of acetone and contacted in a first step with sodium hydroxide and the resulting alkali cellulose is contacted with monochloroacetic acid and etherified in a second step while still slurried in an aqueous solution of acetone, the improvement which consists of maintaining a total liquid-to-cellulose ratio in said steps of about 25 to 1 while contacting the cellulose and the alkali cellulose respectively, in said steps with about 2.2 moles of sodium hydroxide and about 1 mole of monochloroacetic acid per mole of cellulose while further maintaining as liquid ratios in said first step, a water-to-cellulose ratio of about 4.00 to 1 and an acetone-to-water ratio of about 5.00 to 1, while contacting the slurried cellulose with the sodium hydroxide at a slurry temperature of about 25° C. by adding the sodium hydroxide as a 50% solution in water over a period of about 0.2 hour while the slurry is vigorously agitated and maintaining said slurry temperature and said vigorous agitation for an additional period of about 0.3 hour and altering said liquid ratios in said second step to a water-to-cellulose ratio of about 2.30 to 1 and an acetone-to-water ratio of about 10 to 1, while contacting the alkali cellulose with the monochloroacetic acid by adding the monochloroacetic acid over a period of about 0.2 hour with vigorous agitation at a slurry temperature of about 70° C. and continuing said vigorous agitation for a period of about 3 hours, whereby carboxymethyl cellulose exhibiting high substitution uniformity and improved clarity in aqueous solutions is produced in an efficient manner with regard to the amount of etherifying agent used in said second step.

4. In a slurry process for the production of carboxymethyl cellulose wherein cellulose is slurried in an aqueous solution of acetone and contacted in a first step with a water-soluble alkali metal hydroxide and the resulting alkali cellulose is contacted with monochloroacetic acid and etherified in a second step while still slurried in an aqueous solution of acetone, the improvement which consists of maintaining a total liquid-to-cellulose ratio in said steps of about 15 to about 35 to 1, a water-to-cellulose ratio of about 1.85 to about 8.75 to 1 and an acetone-to-water ratio of about 3 to about 7 to 1, while contacting the cellulose and the alkali cellulose in said steps with a total of about 2 to about 2.5 moles of a water-soluble alkali metal hydroxide per mole of monochloroacetic acid and using about 0.4 mole to about 2.5 moles of monochloroacetic acid per mole of cellulose; contacting the slurried cellulose with the water-soluble alkali metal hydroxide at a slurry temperature of about 0° C. to about 30° C. for a period of about 0.1 to about 1 hour and contacting the alkali cellulose with the monochloroacetic acid at a slurry temperature of about 40° C. to about 100° C. for a period of about 0.3 to about 10 hours, whereby carboxymethyl cellulose exhibiting high substitution uniformity and improved clarity in aqueous solutions is produced in an acetone slurry process.

5. In a slurry process for the production of carboxymethyl cellulose wherein cellulose is slurried in an aqueous solution of acetone and contacted in a first step with sodium hydroxide and the resulting alkali cellulose is contacted with monochloroacetic acid and etherified in a second step while still slurried in an aqueous solution of acetone, the improvement which consists of maintaining a total liquid-to-cellulose ratio in said steps of about 20 to about 30 to 1, a water-to-cellulose ratio of about 2.15 to about 7.00 to 1 and an acetone-to-water ratio of about 4 to about 6 to 1, while contacting the cellulose and the alkali cellulose in said steps with a total of about 2 to about 2.5 moles of sodium hydroxide per mole of monochloroacetic acid and using about 0.4 mole to about 2.5 moles of monochloroacetic acid per mole of cellulose; contacting the slurried cellulose with the sodium hydroxide at a slurry temperature of about 5 to about 25° C. for a period of about 0.2 to about 0.6 hours and contacting the alkali cellulose with the monochloroacetic acid at a slurry temperature of about 65° C. to about 75° C. for a period of about 2 to about 5 hours, whereby carboxymethyl cellulose exhibiting high substitution uniformity and improved clarity in aqueous solutions is produced in an acetone slurry process.

6. In a slurry process for the production of carboxymethyl cellulose wherein cellulose is slurried in an aqueous solution of acetone and contacted in a first step with sodium hydroxide and the resulting alkali cellulose is contacted with monochloroacetic acid and etherified in a second step while still slurried in an aqueous solution of acetone, the improvement which consists of maintaining a total liquid-to-cellulose ratio in said steps of about 25 to 1, a water-to-cellulose ratio of about 4.00 to 1 and an acetone-to-water ratio of about 5.00 to 1 while contacting the cellulose and the alkali cellulose in said steps with about 2.2 moles of sodium hydroxide and about 1 mole of monochloroacetic acid per mole of cellulose; contacting the slurried cellulose with the sodium hydroxide at a slurry temperature of about 25° C. by adding the sodium hydroxide as a 50% solution in water over a period of about 0.2 hour while the slurry is vigorously agitated and maintaining said slurry temperature and said vigorous agitation for an additional period of about 0.3 hour and thereafter contacting the alkali cellulose with the monochloroacetic acid by adding the monochloroacetic acid over a period of about 0.2 hour with vigorous agitation at a slurry temperature of about 70° C. and continuing said vigorous agitation for a period of about 3 hours, whereby carboxymethyl cellulose exhibiting high substitution uniformity and improved clarity in aqueous solutions is produced in an acetone slurry process.

References Cited
UNITED STATES PATENTS 3,069,409   12/1962   Henry et al. _____ 260—231

DONALD E. CZAJA, *Primary Examiner.*

LEON J. BERCOVITZ, *Examiner.*

R. W. MULCAHY, *Assistant Examiner.*